United States Patent
Glock

(10) Patent No.: US 11,215,360 B2
(45) Date of Patent: Jan. 4, 2022

(54) METHOD AND DEVICE FOR DRYING WOOD CHIPS

(71) Applicant: GLOCK ÖKOENERGIE GMBH, Griffen (AT)

(72) Inventor: Gaston Glock, Velden (AT)

(73) Assignee: GLOCK ÖKOENERGIE GMBH, Griffen (AT)

( * ) Notice: Subject to any disclaimer, the term of this patent is extended or adjusted under 35 U.S.C. 154(b) by 203 days.

(21) Appl. No.: 16/808,144

(22) Filed: Mar. 3, 2020

(65) Prior Publication Data

US 2020/0200384 A1     Jun. 25, 2020

Related U.S. Application Data

(63) Continuation-in-part of application No. 15/233,074, filed on Aug. 10, 2016, now abandoned.

(30) Foreign Application Priority Data

Aug. 18, 2015 (AT) .................... A 546/2015

(51) Int. Cl.
*F23G 5/04* (2006.01)
*F23G 5/44* (2006.01)
(Continued)

(52) U.S. Cl.
CPC ............... *F23G 5/04* (2013.01); *F23G 5/027* (2013.01); *F23G 5/444* (2013.01); *F23G 5/46* (2013.01); *F26B 3/06* (2013.01); *F23G 2201/10* (2013.01)

(58) Field of Classification Search
CPC ... F23G 5/46; F23G 5/04; F23G 5/027; F23G 5/444; F23G 2201/10; F26B 23/028;
(Continued)

(56) References Cited

U.S. PATENT DOCUMENTS 1,843,167 A * 2/1932 Lucke .................... F23L 15/04
110/104 R
2,939,411 A * 6/1960 Priestley .................. F23K 1/04
110/190
(Continued)

FOREIGN PATENT DOCUMENTS

DE          4308522 A1    9/1994
DE    102008059182 A1 * 6/2010 ................ C10L 5/46
(Continued)

OTHER PUBLICATIONS

U.S. Patent and Trademark Office, Non-Final Office Action in U.S. Appl. No. 15/204,602, dated Jan. 17, 2018, 6 pages.
(Continued)

*Primary Examiner* — Jorge A Pereiro
*Assistant Examiner* — Bao D Nguyen
(74) *Attorney, Agent, or Firm* — Raven Patents, LLC; Anton E. Skaugset

(57) ABSTRACT

A method and device for drying wood chips to be used as raw material for a gas-generating reactor, the device being disposed between the storage for wood chips and the reactor. Product gas of the reactor is at least partially used in a block-type thermal power station (BHKW), and hot air from the housing of the block-type thermal power station is used to heat and dry wood chips in a drying hopper which has at least one outlet for the cooled humidified air. The wood chips enter the drying hopper through a first air-tight lock and exit the drying hopper through a second air-tight lock.

9 Claims, 3 Drawing Sheets

(51) Int. Cl.
  *F23G 5/027* (2006.01)
  *F26B 3/06* (2006.01)
  *F23G 5/46* (2006.01)

(58) Field of Classification Search
  CPC ........ F26B 3/06; F26B 17/122; F26B 23/001;
    F26B 2200/24; F26B 3/08; F23K 1/04;
    Y02E 50/10; Y02E 20/14; Y02E 50/30;
    Y02P 70/405
  See application file for complete search history.

(56) References Cited

U.S. PATENT DOCUMENTS

| | | | | |
|---|---|---|---|---|
| 3,058,229 A * | 10/1962 | Downing | F26B 23/028 | 34/385 |
| 3,721,014 A * | 3/1973 | Voelskow | F26B 3/00 | 34/371 |
| 3,817,724 A * | 6/1974 | Ellis et al. | C10J 3/00 | 48/209 |
| 3,896,746 A * | 7/1975 | Pirsh | F23K 1/04 | 110/104 R |
| 4,030,895 A * | 6/1977 | Caughey | C10J 3/20 | 48/111 |
| 4,152,110 A * | 5/1979 | Jukkola | F23K 3/02 | 432/14 |
| 4,290,269 A * | 9/1981 | Hedstrom | C10F 5/00 | 60/670 |
| 4,309,195 A * | 1/1982 | Rotter | C10J 3/26 | 48/111 |
| 4,337,584 A * | 7/1982 | Johnson | F26B 23/005 | 34/65 |
| 4,345,173 A * | 8/1982 | Marchant | H02K 44/08 | 310/11 |
| 4,414,813 A * | 11/1983 | Knapp | F01K 23/06 | 60/39.182 |
| 4,627,173 A * | 12/1986 | O'Hagan | F23G 5/30 | 110/224 |
| 4,628,833 A * | 12/1986 | O'Hagan | F23G 5/30 | 110/224 |
| 4,635,379 A * | 1/1987 | Kroneld | F26B 17/04 | 34/413 |
| 4,638,629 A * | 1/1987 | Archer | F02C 3/22 | 60/775 |
| 4,690,076 A * | 9/1987 | Peletz, Jr. | F23K 1/04 | 110/106 |
| 4,718,362 A * | 1/1988 | Santen | B01D 53/68 | 110/346 |
| 4,745,868 A * | 5/1988 | Seabury | F23K 1/04 | 110/226 |
| 4,787,152 A * | 11/1988 | Mark | B01J 8/36 | 34/369 |
| 4,860,536 A * | 8/1989 | Brannstrom | F22B 31/0023 | 60/39.464 |
| 5,373,648 A * | 12/1994 | Wolf | F26B 3/08 | 165/104.16 |
| 5,401,282 A * | 3/1995 | Leininger | C10K 1/024 | 48/197 R |
| 5,419,267 A * | 5/1995 | Raiko | F23C 10/10 | 110/245 |
| 5,515,914 A * | 5/1996 | Lashbrook, Jr. | F16L 19/0218 | 165/178 |
| 5,581,998 A * | 12/1996 | Craig | F02C 3/20 | 60/800 |
| 5,922,090 A * | 7/1999 | Fujimura | F23J 15/006 | 48/197 R |
| 6,077,490 A * | 6/2000 | McIlroy | B01D 46/002 | 423/215.5 |
| 6,138,381 A * | 10/2000 | Åbyhammar | F26B 23/028 | 34/468 |
| 7,896,956 B2 * | 3/2011 | Takase | B01D 46/006 | 95/278 |
| 2002/0106538 A1 * | 8/2002 | Lenglet | C01B 3/36 | 429/411 |
| 2003/0106266 A1 * | 6/2003 | Bryan | C10J 3/86 | 48/197 FM |
| 2004/0237859 A1 * | 12/2004 | Hartmann | F23G 7/06 | 110/341 |
| 2005/0121533 A1 * | 6/2005 | Johnson | F24H 3/065 | 237/16 |
| 2006/0075682 A1 * | 4/2006 | Bullinger | F26B 3/084 | 44/626 |
| 2006/0107587 A1 * | 5/2006 | Bullinger | C10L 9/08 | 44/629 |
| 2006/0199134 A1 * | 9/2006 | Ness | B03B 4/06 | 432/121 |
| 2007/0117195 A1 * | 5/2007 | Warner | C12P 7/08 | 435/161 |
| 2008/0201980 A1 * | 8/2008 | Bullinger | C10J 3/482 | 34/493 |
| 2008/0202028 A1 * | 8/2008 | Tsangaris | C10J 3/463 | 48/73 |
| 2009/0158618 A1 * | 6/2009 | Tuck | F26B 17/026 | 34/639 |
| 2009/0250331 A1 * | 10/2009 | Hopkins | F26B 17/20 | 201/6 |
| 2010/0043445 A1 * | 2/2010 | Coronella | F02C 3/28 | 60/780 |
| 2010/0242351 A1 * | 9/2010 | Causer | F23G 5/04 | 44/505 |
| 2010/0251616 A1 * | 10/2010 | Paoluccio | C10B 53/02 | 48/197 R |
| 2010/0251942 A1 * | 10/2010 | O'Boyle | B01D 53/508 | 110/215 |
| 2010/0293956 A1 * | 11/2010 | Nadkarni | F23G 5/027 | 60/748 |
| 2011/0179981 A1 * | 7/2011 | Van Naarden | C10L 5/445 | 110/219 |
| 2011/0209647 A1 * | 9/2011 | Mitchell | F23C 99/005 | 110/342 |
| 2011/0219639 A1 * | 9/2011 | Groisbock | F26B 17/14 | 34/443 |
| 2011/0265734 A1 * | 11/2011 | Kim | F23G 5/0276 | 122/22 |
| 2011/0308230 A1 * | 12/2011 | Takase | F02C 3/28 | 60/39.182 |
| 2011/0314730 A1 * | 12/2011 | Gomez | F23K 1/04 | 44/620 |
| 2012/0006025 A1 * | 1/2012 | Koyama | F01K 9/003 | 60/670 |
| 2012/0111715 A1 * | 5/2012 | Krois | F26B 23/001 | 201/15 |
| 2012/0167461 A1 * | 7/2012 | Bentzen | C10K 1/06 | 48/61 |
| 2012/0266793 A1 * | 10/2012 | Bohlig | F23G 5/027 | 110/342 |
| 2012/0311991 A1 * | 12/2012 | Mall | C10K 1/024 | 60/39.12 |
| 2013/0019528 A1 * | 1/2013 | Mall | C10J 3/26 | 48/87 |
| 2013/0047573 A1 * | 2/2013 | Mishra | C10K 1/026 | 60/39.12 |
| 2013/0047616 A1 * | 2/2013 | Holmes | F24D 11/009 | 60/670 |
| 2013/0133305 A1 * | 5/2013 | DePuy | C10K 1/002 | 60/39.12 |
| 2013/0142723 A1 * | 6/2013 | Dara | C10J 3/26 | 423/352 |
| 2013/0257059 A1 * | 10/2013 | Mason | C10B 53/02 | 290/1 A |
| 2013/0276628 A1 * | 10/2013 | Chalabi | B01D 46/0068 | 95/9 |
| 2013/0331961 A1 * | 12/2013 | Mosley | G05B 19/4185 | 700/73 |
| 2014/0175803 A1 * | 6/2014 | DePuy | F02B 43/08 | 290/1 A |
| 2014/0250858 A1 * | 9/2014 | Mazumdar | F02C 3/28 | 60/39.12 |

(56) References Cited

U.S. PATENT DOCUMENTS

| | | | | |
|---|---|---|---|---|
| 2014/0290251 A1* | 10/2014 | Sugasawa | ............... | F26B 3/08 60/670 |
| 2014/0338217 A1* | 11/2014 | Bjorklund | ............... | C10L 5/442 34/385 |
| 2016/0017801 A1* | 1/2016 | Xue | ............... | C10J 3/62 60/39.12 |
| 2016/0024389 A1* | 1/2016 | Endou | ............... | C10L 9/083 60/670 |
| 2017/0275543 A1* | 9/2017 | Senger | ............... | C10J 3/40 |
| 2020/0335233 A1* | 10/2020 | Conway | ............... | G21C 19/07 |

FOREIGN PATENT DOCUMENTS

| | | | | | |
|---|---|---|---|---|---|
| DE | 102014009351 A1 | 12/2015 | | | |
| EP | 1873229 A1 | * | 1/2008 | ............ | C10J 3/723 |
| EP | 2341229 A1 | | 7/2011 | | |
| EP | 2902738 A1 | | 8/2015 | | |
| GB | 2348695 A | * | 10/2000 | ............ | F23G 5/0276 |
| WO | 03042520 A1 | | 10/2013 | | |

OTHER PUBLICATIONS

U.S. Patent and Trademark Office, Final Office Action in U.S. Appl. No. 15/204,602, dated Jun. 22, 2018, 6 pages.
U.S. Patent and Trademark Office, Non-Final Office Action in U.S. Appl. No. 15/204,602, dated Nov. 7, 2018, 6 pages.
U.S. Patent and Trademark Office, Non-Final Office Action in U.S. Appl. No. 15/233,074, dated Mar. 12, 2019, 16 pages.
U.S. Patent and Trademark Office, Non-Final Office Action in U.S. Appl. No. 15/204,602, dated Jun. 21, 2019, 7 pages.
U.S. Patent and Trademark Office, Final Office Action in U.S. Appl. No. 15/233,074, dated Oct. 3, 2019, 24 pages.

* cited by examiner

METHOD AND DEVICE FOR DRYING WOOD CHIPS

CROSS-REFERENCE TO RELATED APPLICATIONS

This application is a continuation-in-part under 35 U.S.C. § 120 of U.S. patent application Ser. No. 15/233,074, filed Aug. 10, 2016, which is hereby incorporated by reference.

BACKGROUND

The invention relates to a method and to a device for drying wood chips to be used as the raw material for a gas generator (reactor) as is described in the as yet not published EP 15158828.8 of the same applicant, particularly where the gas generator is operated in conjunction with a block-type thermal power station.

In contrast to conventional industrial power generation, a block-type thermal power station (also known as a block-unit heating power plant, combined heat and power (CHP) plant, or cogeneration plant) is a relatively small unit that generates both electricity and heat at a local level, such as for a small city or even an area of a few blocks. By employing local power and heat generation, the high losses associated with long-distance distribution are eliminated. In addition, these small-scale combined heat-and-power generators exhibit markedly enhanced operating efficiencies compared to industrial power plants.

Block-type thermal power stations are small power stations based on combustion engines. The combustion engine drives a generator that produces electricity, and the heat produced by the engine is captured by an integrated heat exchanger and used locally, for example for residential heating. The small scale of these block-type thermal power stations do not require large industrial sites, and they are typically simply enclosed within a building or other enclosure.

Block-type thermal power stations can be deployed quickly, cost-effectively, and with few geographic limitations. The power station engine can use a variety of fuels, such as oil, natural gas, wood, or various biomass materials. Where biomass is used as fuel, it is typically subjected to gasification first to generate product gas, which is then burned by the cogeneration plant.

However, in order to gasify a biomass such as wood chips, the wood chips should have a moisture content of maximum 15% in percentage by weight in relation to the dry weight of the wood chips. "Raw" wood chips, in contrast, usually have a moisture content of between 35 and 50% of weight. Wood chips in the prior art are therefore dried in special dryers, mostly using energy which is procured independently of the energy flow of the later use of the wood chips (external energy), and then temporarily stored in one or else a plurality of hoppers. Said wood chips by way of storage again absorb moisture from the ambient air, this having to be considered in the context of the degree of drying. The dryers and the hoppers require space, tie up capital, and require maintenance.

Despite the large amount of heat released in the gasification reactor, drying wood during introduction into the reactor or thereafter is not possible since the required evaporation heat lowers the temperature that is reached in the reactor to such an extent that the temperature required for the generation of synthetic gas according to the Boudouard equilibrium is no longer attained.

Literature which concerns thermal transfer in various plants and to some extent drying of primary materials and which may be cited include US 2013/257 059 (compact plant for the gasification of biomass for producing electricity), DE 43 08 522 (heating air for indirect heating of drying plants with air), WO 03/042 520 (drying using residual heat of exhaust gases), EP 2 341 229 (utilization of turbine exhaust gas for drying fuel), EP 2 902 738 (ditto) and DE 10 2014 009 351 (utilization of exhaust heat in the form of radiation energy thereof). All these devices and methods require complex apparatus and interfere with the respective reactor processes, leading to complex consequences with secondary effects which are often uncontrollable. Moreover, handling and manipulating exhaust gases which ultimately are toxic and contain pollutants is precarious at all times and in the case of a secondary utilization of this type makes subsequent cleaning, which is often prescribed and should always be considered desirable, complicated and complex.

It is an object of the invention to provide method management which is simpler and more cost-effective, and robust equipment that is correspondingly cost-effective in terms of plant technology.

SUMMARY

The present application is directed to methods and devices for drying wood chips for used in a gas generator (reactor) that is operated in conjunction with a heat-and-power generator of a block-type thermal power station.

In some examples the present disclosure relates to methods for drying wood chips for use as a raw material for a gasification reactor, wherein at least a portion of a product gas of the gasification reactor is combusted by a combined heat-and-power generator of a block-type thermal power station (BHKW), the method including: adding the wood chips to a drying hopper through a first air-tight lock, directing heated ambient air from a building or encapsulation of the block-type thermal power station, where the ambient air is heated by heat radiation from the heat-and-power generator of the block-type thermal power station disposed within the building or encapsulation, heating and at least partially drying the wood chips in the drying hopper using the heated ambient air, and discharging the at least partially dried wood chips from the drying hopper through a second air-tight lock.

In some examples, the present disclosure relates to devices for drying wood chips for use as a raw material in a gasification reactor, where at least a portion of the product gas of the gasification reactor is combusted by a combined heat-and-power generator of a block-type thermal power station (BHKW), the device comprising a building or encapsulation that encloses the heat-and-power generator of the block-type thermal power station, such that the ambient air within the building or encapsulation is heated by the heat-and-power generator during operation, a storage container for the wood chips, a drying hopper disposed between the storage container and the gasification reactor that is configured to receive wood chips from the storage container via a gas-tight entry lock and to discharge dried wood chips to the gas-generating reactor via a gas-tight exit lock, an air inlet for the drying hopper that receives heated ambient air from the building or encapsulation, and an air outlet for the drying hopper for discharging cooled humidified air.

DETAILED DESCRIPTION

The method of drying wood chips according to the present disclosure includes adding the wood chips to a drying hopper. In particular, the heated air from the building or encapsulation of the block-type thermal power station is directed into the drying hopper in a lower region of the hopper that is preferably directly upstream of the gasification reactor. As the wood chips move from the top of the drying hopper to the bottom, the heated air directed into the drying hopper moves in a counter flow from the lower region of the hopper toward the top of the drying hopper.

It should be appreciated that addition air that has been heated by external energy (such as by a heat exchanger) may also be blown into the drying hopper, particularly when the operation of the gasification reactor and/or the heat-and-power generator has just been initiated.

Selected embodiments of the drying hopper, when viewed in the direction of the method sequence, may be disposed as directly as possible ahead of the gasification reactor, and in terms of plant technology disposed preferably above the hopper, and for the heated air derived from the block-type thermal power station, the air flow may be at least partially controlled by a respective regulator element, to be introduced in a suitable amount into the lower region of the hopper and for said air to be extracted in the upper region of said hopper. The raw material stream is preferably infed to the drying hopper and removed therefrom, respectively, by locks that are as gas-tight as possible, preferably by rotary-valve type locks, or the like.

The (at least predominantly) used energy is thus supplied by the heated air supplied from the building or encapsulation of the heat-and-power generator, which may be considered exhaust heat, arising from radiation losses of the engine block of the heat-and-power generator, which may rise within the building or encapsulation within which the heat-and-power generator is accommodated. The heat energy of the heated air may therefore be considered quasi "free of charge".

After exiting the drying hopper, the dried comminuted wood chip product no longer comes into contact with the ambient air and thus does not absorb more moisture. Therefore costly drying bases and intermediate hoppers can be completely dispensed with.

Figure 1:
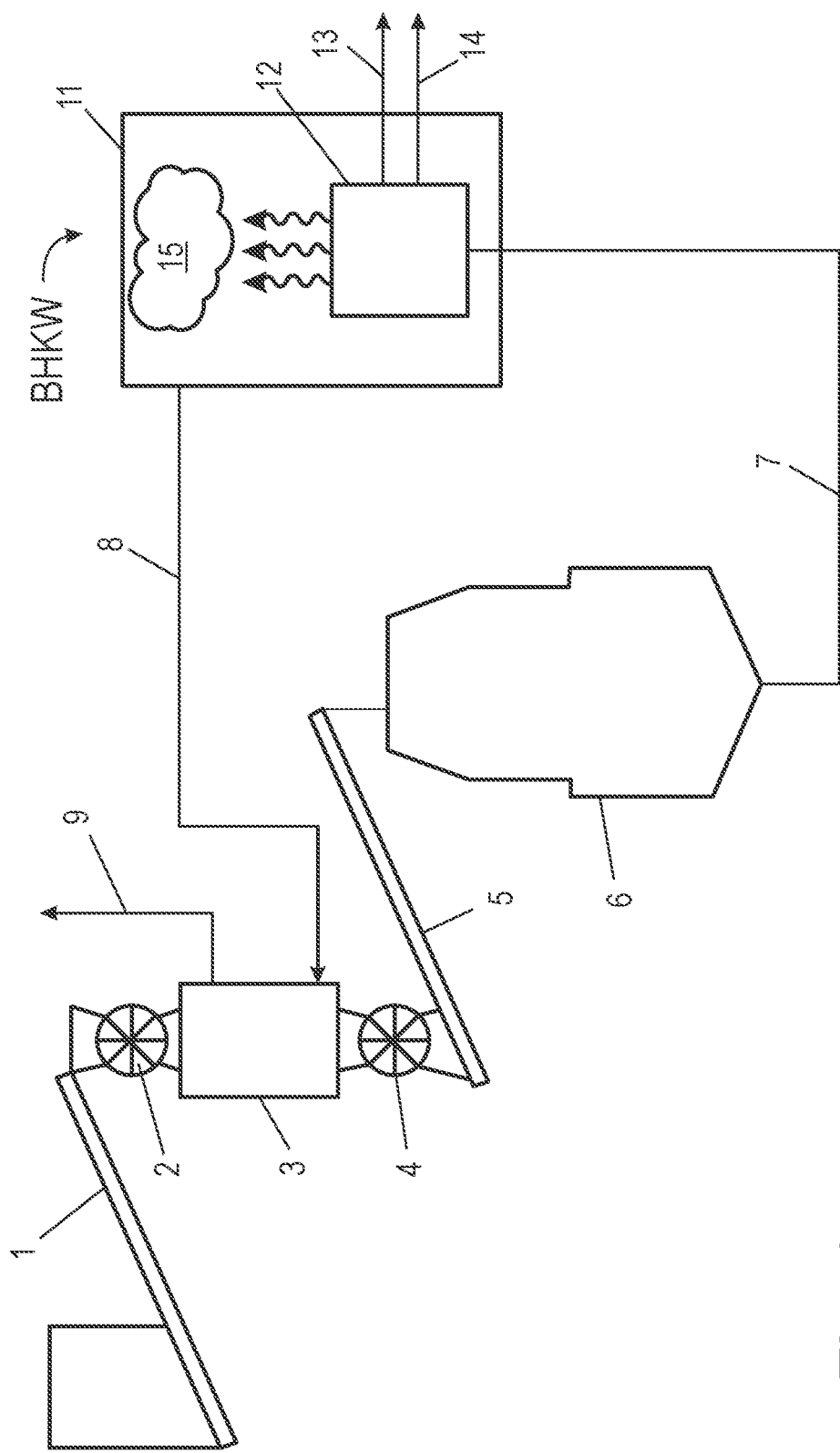
FIG. 1 very schematically shows a flow diagram according to the present disclosure.

As can be seen FIG. 1, the raw material to be gasified, that is to say wood in chip form, from a pile, a tank, or a hopper, etc., by way of a conveying line 1 reaches a gas-tight lock 2, for example a rotary-valve type lock. From there, the raw material drops or slides into a drying hopper 3 at the lower end of which said raw material is removed, again by way of a gas-tight lock 4, and optionally by way of an intermediate line 5 reaches the gasification reactor 6.

The gasification reactor 6 is well-known in various embodiments in the prior art and is therefore not explained in more detail. It should only be stated that at least one product gas line 7 leads out of the gasification reactor 6 (in the illustration in a purely schematic manner leading out of the base of the reactor, but in many cases leading out of a region thereabove), in which the product gas is transported for further use. This use presently includes combustion by the heat-and-power generator of a block-type thermal power station (BHKW) preferably disposed near the gasification generator.

It has been observed that the temperature of the ambient air within a building or encapsulation 11 that encloses a heat-and-power generator 12 of a stationary block-type thermal power station (BHKW) can be significantly higher than in the surroundings due to the heat radiation from the heat-and-power generator within the building comprising the block-type thermal power station, said building colloquially often being used interchangeably with the term block-type thermal power station. This warmed ambient air 15 typically rises within building or encapsulation 11, as shown in FIG. 1.

A regulatable hot air line 8 can be used to transport the heated ambient air 15 from building or encapsulation 11 of the block-type thermal power station, preferably from the roof region or the ceiling region thereof, respectively, in which hot air accumulates to the lower region of the drying hopper 3, for example terminating in one or preferably a plurality of nozzle-type openings in the interior of the hopper. This infed hot air heated by the heat radiation within the building or encapsulation 11 of the block-type thermal power station serves to dry the incoming raw material and also heat the latter in a counter-flow manner. The resulting cooled airflow, now charged with humidity, is discharged from the upper region of drying hopper 3 by way of one or preferably a plurality of removal openings, and then is discharged by way of a ring line or the like, and by way of an exhaust air line 9. This cooled air which is charged with humidity is harmless and, following optional filtration, can be vented to the environment.

Figure 2:
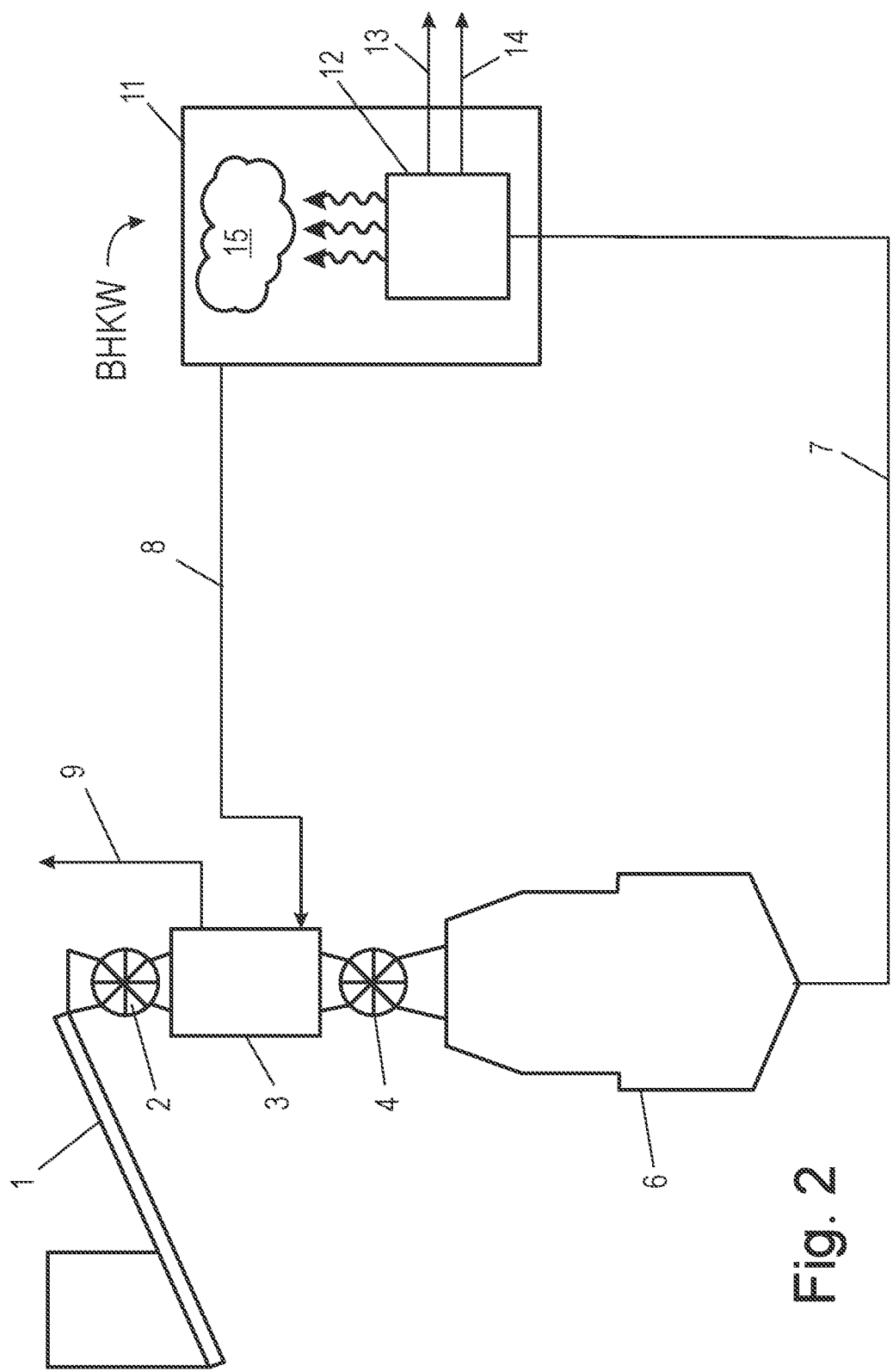
FIG. 2 schematically shows an alternative arrangement of selected individual components of a device according to the present disclosure.

It can be achieved by this type of drying that operational conditions which are particularly favorable and advantageous for wood gasification can be readily and permanently maintained in the reactor 6. It has been found to be particularly advantageous that the drying hopper 3, in which drying takes place, and the reactor 6 in spatial terms are disposed close to one another such that the material, that is to say the raw material or the wood chips, reaching the reactor are not only dry, as has already been targeted in the past, but that due to the proximity the thermal energy applied to the raw material during drying be returned to the reactor. With reference to purely schematic FIG. 1 this means that the airlock 4 be placed directly at the head of the gasification reactor 6 instead of the intermediate line 5, as shown in FIG. 2. In this way, the energy required for reaching the favorable side of the Boudouard equilibrium is obtained in a particularly favorable manner.

It has furthermore been found that this is at least substantially also possible by employing external energy if and when, as already mentioned, also the spatial proximity and also heating and drying of the raw material which will reach the gasification reactor (convertor) in the closest possible future is always ensured in this instance, this being the most important factor as the energy employed for drying is returned thereby to the largest possible extent to the reactor, the thermal losses thus being able to be minimized. Providing preferably only additional heating by external energy may be expedient for the starting-up procedure of the wood gasification and for extreme operational situations. Herein, instead of or additionally to the ambient air collected from the building or encapsulation of the block-type thermal power station, air (ambient air, exhaust air from buildings, etc.) is heated in heat exchangers using external energy and blown through the drying bunker, preferably from the bottom to the top. The use of external heating 10 in this manner is depicted schematically in FIG. 3.

Figure 3:
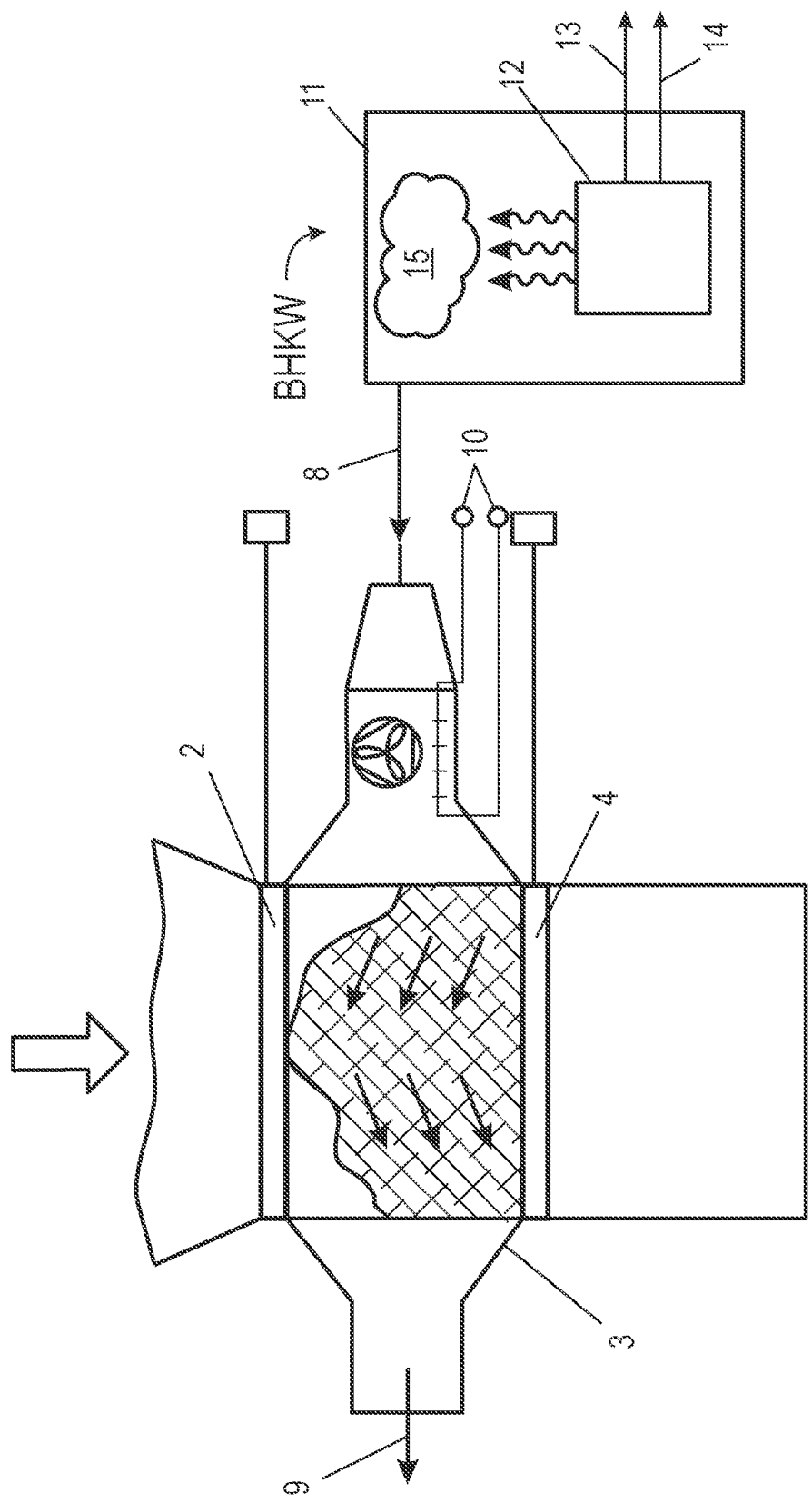
FIG. 3 schematically shows an arrangement of selected components of a device according to the present disclosure.

As shown in FIG. 3, heated air transferred by hot air line 8 from the building or encapsulation 11 of the block-type thermal power station and/or from an external heating source, is blown in a substantially horizontal manner and thus in a cross flow through the drying hopper 3. Slides or rotary slides, respectively, are indicated as locks 2 and 4. The particular configuration of the inflow nozzles or of the outlet openings, respectively, is readily implementable by a person skilled in the art and with knowledge of the invention. An arrangement of this type in the case of different installation situations may better utilize the available space; the thermal and process-technological dissimilarities can be readily judged and considered by a person skilled in the art and with knowledge of the invention.

That as good as possible thermal insulation of the drying hopper and placement thereof in the shed should be performed at a location which is as warm as possible and as close as possible to the reactor when carrying out a process of this type will not be further surprising to a person skilled in the art, based on the narrative to date.

It should be furthermore pointed out that in the description and in the claims statements such as "largely" in the case of materials mean in excess of 50% in weight, preferably in excess of 80% in weight, and particularly preferably in excess of 95% in weight; that "lower region" of a reactor, a filter, a building, or a device, or very generally of an item means the lower half and in particular the lower quarter of the total height, "lowermost region" means the lowermost quarter and in particular an even smaller part; while "central region" means the central third of the total height. All these statements, likewise "top", "bottom", "front", "rear", etc. have their common meaning applied to the respective item in the position according to the intended use.

"Substantially" in the description and in the claims may be delimited using a deviation of 10% of the stated value to the higher and to the lower side, if this is physically possible, otherwise only in the meaningful direction; in the case of values in degrees (angles and temperatures) this means±10°.

REFERENCE NUMERALS

1 Conveying line
2 Gas-tight lock
3 Drying hopper
4 Gas-tight lock
5 Intermediate line
6 Gasification Reactor
7 Product gas line
8 Hot air line
9 Exhaust air line
10 External heating
11 Building or Enclosure
12 Heat-and-Power Generator
13 Thermal Output of Heat-and-Power Generator
14 Power Output of Heat-and-Power Generator
15 Warmed Ambient Air
BHKW Block-type thermal power station

What is claimed is:

1. A method for drying wood chips for use as a raw material for a gasification reactor, wherein at least a portion of a product gas of the gasification reactor is combusted by a combined heat-and-power generator of a block-type thermal power station (BHKW), the method comprising:
   adding the wood chips to a drying hopper through a first air-tight lock;
   directing heated ambient air from a building or encapsulation of the block-type thermal power station, where the ambient air is heated by heat radiation from the heat-and-power generator of the block-type thermal power station disposed within the building or encapsulation;
   heating and at least partially drying the wood chips in the drying hopper using the heated ambient air; and
   discharging the at least partially dried wood chips from the drying hopper through a second air-tight lock.

2. The method of claim 1, further comprising feeding the heated ambient air into a lower region of the drying hopper, and discharging cooled humid air from an upper region of the drying hopper.

3. The method of claim 1, wherein heating and at least partially drying the wood chips includes directing the heated ambient air in the drying hopper in a direction counter to a flow of the wood chips.

4. The method of claim 1, wherein directing the heated ambient air from the building or encapsulation of the block-type thermal power station includes directing the heated ambient air from an upper region of the building or encapsulation of the block-type thermal power station.

5. A device for drying wood chips for use as a raw material in a gasification reactor, wherein at least a portion of a product gas of the gasification reactor is combusted by a combined heat-and-power generator of a block-type thermal power station (BHKW), the device comprising:
   a building or encapsulation that encloses the heat-and-power generator of the block-type thermal power station, such that an ambient air within the building or encapsulation is heated by the heat-and-power generator during operation;
   a storage container for the wood chips;
   a drying hopper disposed between the storage container and the gasification reactor that is configured to receive wood chips from the storage container via a gas-tight entry lock and to discharge dried wood chips to the gas-generating reactor via a gas-tight exit lock;
   an air inlet for the drying hopper that receives heated ambient air from the building or encapsulation; and
   an air outlet for the drying hopper for discharging cooled humidified air.

6. The device of claim 5, wherein the air inlet is disposed in a lower region of the drying hopper, and the air outlet is disposed on an upper region of the drying hopper.

7. The device of claim 5, wherein the drying hopper is disposed in direct proximity of the gasification reactor.

8. The device of claim 7, wherein the drying hopper is disposed adjacent to and above the gasification reactor.

9. The device of claim 8, wherein the drying hopper by way of the gas-tight exit lock is placed on a head of the gasification reactor.

* * * * *